United States Patent
Wang

(10) Patent No.: US 12,022,304 B2
(45) Date of Patent: Jun. 25, 2024

(54) COMMUNICATION METHOD AND APPARATUS, ENTITY, AND STORAGE MEDIUM

(71) Applicant: Tencent Technology (Shenzhen) Company Limited, Shenzhen (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 300 days.

(21) Appl. No.: 17/461,680

(22) Filed: Aug. 30, 2021

(65) Prior Publication Data

US 2021/0392522 A1 Dec. 16, 2021

Related U.S. Application Data

(63) Continuation of application No. PCT/CN2020/094140, filed on Jun. 3, 2020.

(30) Foreign Application Priority Data

Jun. 17, 2019 (CN) .......................... 201910523153.7

(51) Int. Cl.
*H04W 24/04* (2009.01)
*H04L 41/0659* (2022.01)
*H04W 28/08* (2023.01)

(52) U.S. Cl.
CPC ......... *H04W 24/04* (2013.01); *H04L 41/0659* (2013.01); *H04W 28/08* (2013.01)

(58) Field of Classification Search
None
See application file for complete search history.

(56) References Cited

U.S. PATENT DOCUMENTS

2020/0127916 A1* 4/2020 Krishan ............... H04L 47/125
2022/0182923 A1* 6/2022 Yao ..................... H04L 41/5009

FOREIGN PATENT DOCUMENTS

CN 103096393 A 5/2013
CN 103873131 A 6/2014
(Continued)

OTHER PUBLICATIONS

"Support of Indirect Communication (Routing to SCP)", 3GPP TSG-CT WG4 Meeting #91, Apr. 30, 2019, 2 pgs., Retrieved from the Internet: https://www.3gpp.org/DynaReport/IDocExMtg-C3--103--32882.htm.
(Continued)

*Primary Examiner* — Diane L Lo
(74) *Attorney, Agent, or Firm* — Morgan, Lewis & Bockius LLP

(57) ABSTRACT

A communication method is performed at an electronic device that includes a first network function (NF) entity. The first NF entity indirectly communicates with a second NF entity using a first service communication proxy (SCP) network element. In some embodiments, in accordance with a determination that the first SCP network element fails, the first NF entity detects a second SCP network and performs indirect communication with the second NF entity using the second SCP network element. In some embodiments, in accordance with a determination that the first SCP network element fails, the first NF entity directly communicates with the second NF entity. In this way, the first NF entity and the second NF entity can continue communication, thus ensuring the continuity and the reliability and availability of a communication system.

20 Claims, 7 Drawing Sheets

(56) References Cited

FOREIGN PATENT DOCUMENTS

| CN | 104144521 | A | 11/2014 |
|---|---|---|---|
| CN | 105790995 | A | 7/2016 |
| CN | 107623589 | A | 1/2018 |
| CN | 110234140 | A | 9/2019 |
| EP | 2587774 | A1 | 5/2013 |
| JP | 2013051509 | A | 3/2013 |
| JP | 2014535209 | A | 12/2014 |

OTHER PUBLICATIONS

"3rd Generation Partnership Project; Technical Specification Group Services and System Aspects; System Architecture for the 5G System; Stage 2 (Release 16)", 3GPP Draft, 23.501 V16.1.0, 3rd Generation Partnership Project (3GPP), F-06921 Sophia-Antipolis Cedex, France, Jun. 11, 2019, XP051756422, 367 pgs., Retrieved from the Internet: http://www.3gpp.org/ftp/tsg_sa/WG2_Arch/Latest_SA2_Specs/DRAFT_INTERIM/Archive/23501g10_CRs_Implemented_R2.zip.

"3rd Generation Partnership Project; Technical Specification Group Services and System Aspects; Procedures for the 5G System; Stage 2 (Release 16)", 3GPP Draft; 23.502, V16.0.2, 3rd Generation Partnership Project (3GPP), 650 Route Des Lucioles, F-06921 Sophia-Antipolis Cedex, France, vol. SA WG2, Apr. 1, 2019, XP051751807, 419 pgs., Retrieved from the Internet: http://www.3gpp.org/ftp/tsg%5Fsa/WG2%5FArch/Latest%5FSA2%5FSpecs/DRAFT%5FINTERIM/Archive/23502%2Dg02%5FMCC%5FCorrections%2Ezip.

"3rd Generation Partnership Project; Technical Specification Group Core Network and Terminals: Study on IETF QUIC Transport for 5GC Service Based Interfaces; (Release 16)", 3GPP Standard, Technical Report,NPL 3GPP TR 29.893, V1.1.0, $3^{rd}$ Generation Partnership Project (3GPP), 650 Route Des Lucioles, F-06921 Sophia-Antipolis Cedex, France, Apr. 30, 2019, XP051753786, 38 pgs.

Extended European Search Report, EP20825559.6, Jun. 29, 2022, 14 pgs.

Tencent, "Handling Communication with No Available SCP," SA WG2 Meeting #134, S2-1907144, Jun. 18, 2019, 3 pgs.

Tencent, "Handling Communication with No Available SCP," SA WG2 Meeting #135, S2-1909128, Oct. 4, 2019, 3 pgs.

Tencent Technology, ISR, PCT/CN2020/094140, Aug. 26, 2020, 2 pgs.

Tencent Technology, WO, PCT/CN2020/094140, Aug. 26, 2020, 4 pgs.

Tencent Technology, IPRP, PCT/CN2020/094140, Dec. 21, 2021, 5 pgs.

Tencent Technology, Korean Office Action, KR Patent Application No. 1020217030010, Jan. 24, 2024, 7 pgs.

* cited by examiner

COMMUNICATION METHOD AND APPARATUS, ENTITY, AND STORAGE MEDIUM

CROSS-REFERENCE TO RELATED APPLICATIONS

This application is a continuation application of PCT Patent Application No. PCT/CN2020/094140, entitled "COMMUNICATION METHOD AND APPARATUS, ENTITY AND STORAGE MEDIUM" filed on Jun. 3, 2020, which claims priority to Chinese Patent Application No. 201910523153.7, filed with the State Intellectual Property Office of the People's Republic of China on Jun. 17, 2019, and entitled "COMMUNICATION METHOD AND APPARATUS, ENTITY, AND STORAGE MEDIUM", all of which are incorporated herein by reference in their entirety.

FIELD OF THE TECHNOLOGY

This application relates to the field of communication technologies, and specifically, to a communication technology between network function (NF) entities.

BACKGROUND OF THE DISCLOSURE

Starting from Release 15 (R15) of the 5G communication standard formulated by the 3rd Generation Partnership Project (3GPP), an NF network element and an NF service module are introduced into a communication network. The NF service module may be a module located on the NF network element, or may be a module drawn from a virtualized network.

In R15, an NF network element/NF service module as a consumer directly communicates with an NF network element/NF service module as a producer. The producer and the consumer are in a relative relationship. If a party A provides a service to a party B, the party A is a producer (e.g., a provider or a service provider), and the party B is a consumer. An indirect communication technology is introduced in R16. That is, the NF network element/NF service module as the consumer needs to communicate with the NF network element/NF service module as the producer by using a service communication proxy (SCP) network element.

In the R16 standard, an SCP network element used by the NF network element/NF service module as the consumer is statically configured. If the statically configured SCP network element fails, indirect communication of the NF network element/NF service module as the consumer fails.

SUMMARY

Embodiments of this application provide a communication method, to ensure that a first NF entity and a second NF entity can continue business communication when an SCP network element used by the first NF entity for communication with the second NF entity fails, thereby ensuring the business continuity and the reliability and availability of a system. The embodiments of this application further provide a corresponding apparatus, an entity, and a storage medium.

According to one aspect of this application, a communication method is provided at an electronic device that includes a first network function (NO) entity, including:
communicating, by the first NF entity, indirectly with a second electronic device that includes a second NF entity by using a first service communication proxy (SCP) network element;
in accordance with a determination by the first NF entity that the first SCP network element fails, detecting, by the first NF entity, a second. SCP network element,
switching, by the first NF entity, from the first SCP network element to the second SCP network element in accordance with a determination by the first NF entity that the second SCP network element is valid, and indirectly communicating with the second NF entity using the second SCI network element; and
in accordance with a determination that the second SCP network element fails, returning, by the first NF entity, to directly communicating with the second NF entity (e.g., by bypassing the first SCP network element and the second SCP network element).

According to another aspect of this application, a communication apparatus (e.g., an electronic device) is provided, including:
a communication module, configured to indirectly communicate with a second network function (NF) entity by using a first service communication proxy (SCP) network element;
a detection module, configured to detect a second SCP network element when that it is determined that the first SCP network element fails;
a return module, configured to return to directly communicating with the second NF entity when it is determined that the first SCP network element fails; and
a switching module, configured to switch from the first SCP network element to the second SCP network element when the detection module detects that the second SCP network element is valid,
the communication module being further configured to indirectly communicate with the second NF entity by using the second SCP network element that is switched to by the switching module; and
the return module being further configured to return to directly communicating with the second NF entity when the detection module detects that the second SCP network element fails.

In some implementations, the communication apparatus further includes a first selection module,
the first selection module being configured to select a third SCP network element. When the third SCP network element fails to select the second NF entity for the first NF entity, the first selection module selects the first SCP network element to establish a communication connection between the first NF entity and the second NF entity.

In some implementations, the detection module may be further configured to:
select N valid SCP network elements from configured M valid SCP network elements as the second SCP network elements, M being an integer greater than 0, and N being an integer greater than 0 and less than or equal to M.

In some implementations, the detection module may include:
a first transmitting unit, configured to transmit a first query request to a control function entity; and
a first receiving unit, configured to receive a first query response transmitted by the control function entity, the first query response including information about M valid SCP network elements, wherein M is an integer greater than 0; and
the first selection module is further configured to select N valid SCP network elements from the M valid SCP network elements as the second SCP network elements, wherein N is an integer greater than 0 and less than or equal to M.

In some implementations, the detection module may include:
a second transmitting unit, configured to transmit a second query request to a control function entity; and
a second receiving unit, configured to receive a second query response transmitted by the control function entity, the second query response being used for indicating absence of a valid SCP network element, the absence of a valid SCP network element representing that the second SCP network element fails.

In some implementations, when N is greater than 1, the communication apparatus further includes:
a business allocation module, configured to perform business allocation among the N second SCP network elements according to respective load capacity information of the N second SCP network elements.

In some implementations,
the business allocation module is further configured to adjust, when Q second SCP network elements in the N second SCP network elements fail, the business allocation according to respective load capacity information of (N-Q) second SCP network elements, wherein Q and N are integers, and Q is greater than Q and less than N.

In some implementations,
the first selection module is configured to select a second SCP network element from the N second SCP network elements to provide a business service for a connected terminal.

In some implementations, the communication apparatus further includes:
a transmitting module, configured to transmit, to the control function entity or a third NF entity, a first notification message indicating that the first SCP network element or the second SCP network element fails.

In some implementations, the communication apparatus further includes:
a first receiving module, configured to receive, when the first NF entity returns to directly communicating with the second network entity, a second notification message indicating that the first SCP network element is restored to a valid state or the second SCP network element is restored to a valid state; and
the switching module is further configured to switch, according to the second notification message, to indirectly communicating with the second NF entity by using the first SCP network element or the second SCP network element.

In some implementations, the communication apparatus further includes:
a second receiving module, configured to receive, when the first NF entity communicates with the second NF entity by using the second SCP network element, a third notification message indicating that the first SCP network element is restored to a valid state; and
an addition module, configured to add the first SCP network element to a resource pool of candidate valid SCP network elements according to the third notification message.

According to another aspect of this application, an NF entity is provided, including: a communication interface, a processor, and a memory, the memory being configured to store computer executable instructions, the communication interface being configured to, when the NF entity runs, perform actions performed by the communication module according to the second aspect or any implementations of the second aspect, and the processor executing the computer executable instructions stored on the memory, to perform actions performed by the switching module according to the second aspect or any possible implementation of the second aspect. In some implementations, the NF entity is an electronic device. In some implementations the NF entity is an entity that is included in an electronic device.

According to another aspect of this application, a non-transitory computer-readable storage medium is provided, storing instructions, the instructions, when run on a computer (e.g., computing device, electronic device, apparatus, etc.), causing the computer to perform the method according to the first aspect.

According to another aspect of this application, a computer program product including instructions is provided, the instructions, when run on a computer, causing the computer to perform the method according to the first aspect.

In the embodiments of this application, when the SCP network element used by the first NF entity for communication with the second NF entity fails, another available SCP network element may be switched to or the first NF entity may return to directly communicating with the second NF entity. In this way, it can be ensured that the first NF entity can continue business communication with the second NF entity, thereby ensuring the business continuity and the reliability and availability of a system.

DESCRIPTION OF EMBODIMENTS

The embodiments of this application are described in the following with reference to the accompanying drawings. It is obvious that the described embodiments are merely some rather than all of the embodiments of this application. A person of ordinary skill in the art may learn that as the technology evolves and a new scenario emerges, the technical solutions provided in the embodiments of this application are also applicable to a similar technical problem.

In this specification, claims, and the foregoing accompanying drawings of this application, the terms "first", "second", and so on are intended to distinguish between similar objects rather than indicating a specific order or sequence. It is to be understood that the data used in such a way is interchangeable in proper cases, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Embodiments of this application provide a communication method, to ensure that a first NF entity and a second NF entity can continue business communication when an SCP network element used by the first NF entity for communication with the second NF entity fails, thereby ensuring the business continuity and the reliability and availability of a system. The embodiments of this application further provide a corresponding apparatus, an entity, and a storage medium. Detailed descriptions are separately provided below.

Figure 1:
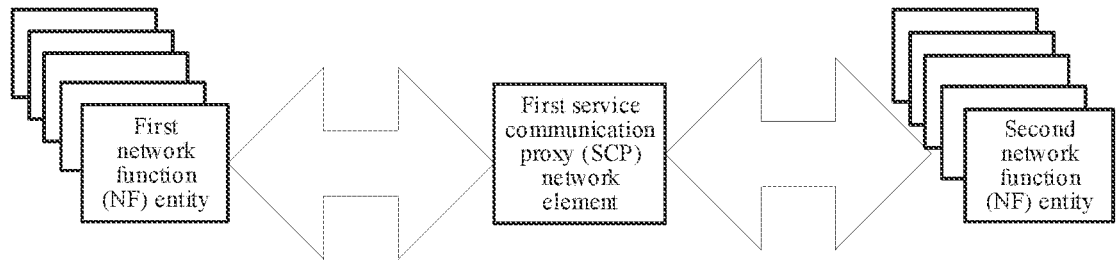
FIG. 1 is a schematic diagram of a network architecture of a communication system according to an embodiment of this application.

FIG. 1 is a schematic diagram of a network architecture of a communication system according to an embodiment of this application.

As shown in FIG. 1, the communication system provided in this embodiment of this application includes a first NF entity, an SCP network element, and a second NF entity. The SCP network element may be a first SCP network element. That is, the first NF entity indirectly communicates with the second NF entity by using the first SCP network element.

The first NF entity and the second NF entity may be network elements or modules that perform one or more particular functions in an operator network, or may be NF network elements, or may be NF service modules. In some embodiments, the first NF entity is a first electronic device or an entity (e.g., a component) that is included in the first electronic device. In some embodiments, the second NF entity is a second electronic device or an entity (e.g., a component) that is included in the second electronic device.

When the first NF entity or the second NF entity is an NF network element, the first NF entity or the second NF entity may include an access and mobility management function (AMF) network element, a session management function (SMF) network element, a user plane function (UPF) network element, a policy control function (PCF) network element, a unified data management (UDM) network element, a unified data repository (UDR) network element, an authentication server function (AUSF) network element, a network slice selection function (NSSF) network element, a network data analytics function (NWDAF) network element, or a network repository function (NRF) network element.

When being an NF service module, the first NF entity or the second NF entity may be a function module of services provided by the foregoing network elements, for example, an AMF service module, an SMF service module, a UPF service module, a PCF service module, a UDM service module, a UDR service module, an AUSF service module, an NSSF service module, an NWDAF service module, or an NRF service module.

The SCP network element may be a device that acts as proxy to implement functions of the foregoing NF network element or NF service module.

In this embodiment of this application, there may be one or more first NF entities, and there may also be one or more second NF entities. The first NF entity may indirectly communicate with the second NF entity by using a plurality of SCP network elements.

One of the first NF entity and the second NF entity may be used as a producer, and the other is used as a consumer. In this embodiment of this application, the first NF entity is used as a consumer, and the second NF entity is used as a producer. There may be various entity combination ways for the first NF entity and the second NF entity. For example, if an AMF network element is used as the first NF entity, an SMF network element may be used as the second NF entity. If a source AMF network element is used as the second NF entity, a target AMF network element may be used as the first NF entity. If a source SMF network element is used as the second NF entity, a target SMF network element may be used as the first NF entity. If a UPF network element is used as the second NF entity, SMF network element may be used as the first NF entity. If a PCF network element is used as the second NF entity, an AMF network element may be used as the first NF entity, or an SMF network element may be used as the first NF entity. Certainly, a producer-consumer relationship between entities is not limited to the types listed herein. Provided that two entities can communicate with each other, a producer-consumer relationship between the first NF entity and the second NF entity can be established.

Both the producer and the consumer described above are at a network-element level. In fact, there may be further corresponding service modules under each network-element level. For example, an AMF network element may include one or more AMF service modules, which may be marked as AMF service 1/2/3/ . . . , and an SMF network element may include one or more SMF service modules, which may be marked as SMF service 1/2/3/ . . . . If the SMF service 1/2/3/ . . . is used as the second NF entity, the AMF service 1 may be used as the first NF entity. Certainly, the AMF service 2 may also be used as the first NF entity. Such a manner is merely described as an example in this embodiment. In fact, for any other relationship between service modules of network elements, reference may be made to the foregoing producer-consumer relationship between the network elements.

The foregoing producer-consumer relationship is relative and is not fixed, and may be determined according to different use scenarios. This is not limited in this embodiment of this application.

Figure 2:
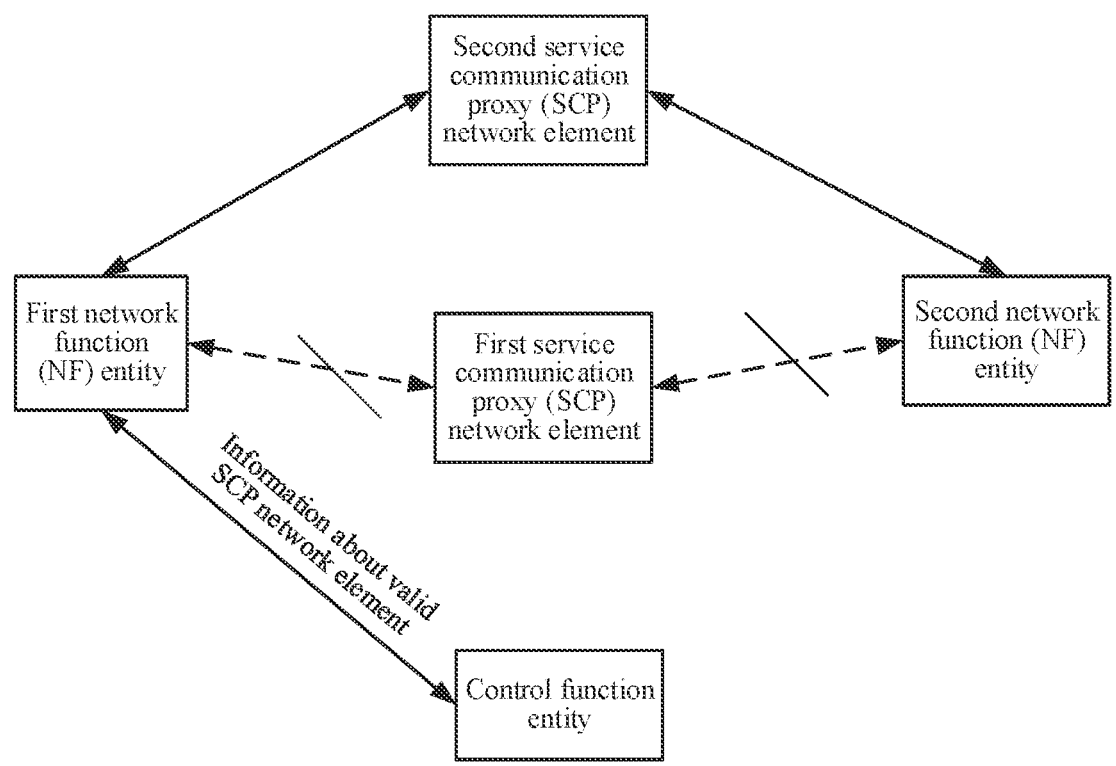
FIG. 2 is a schematic diagram of another network architecture of a communication system according to an embodiment of this application.

Based on the embodiment corresponding to FIG. 1, in another embodiment of a communication system provided in the embodiments of this application, as shown in FIG. 2, which is a schematic diagram of another network architecture of a communication system according to an embodiment of this application, the communication system may further include a control function entity. The control function entity is configured to provide information about valid SCP network elements for the first NF entity when the first SCP network element used by the first NF entity for indirect communication with the second NF entity fails. In this way, the first NF entity may select a second SCP network element from the valid SCP network elements according to the information about the valid SCP network elements, and further indirectly communicate with the second NF entity by using the second SCP network element.

The control function entity may be a network element for recording whether an SCP network element is valid, for example, may be an NRF network element or a domain name system (DNS) network element. The control function entity may alternatively be a service module for recording whether an SCP network element is valid, for example, may be an NRF service module or a DNS service module.

Figure 3:
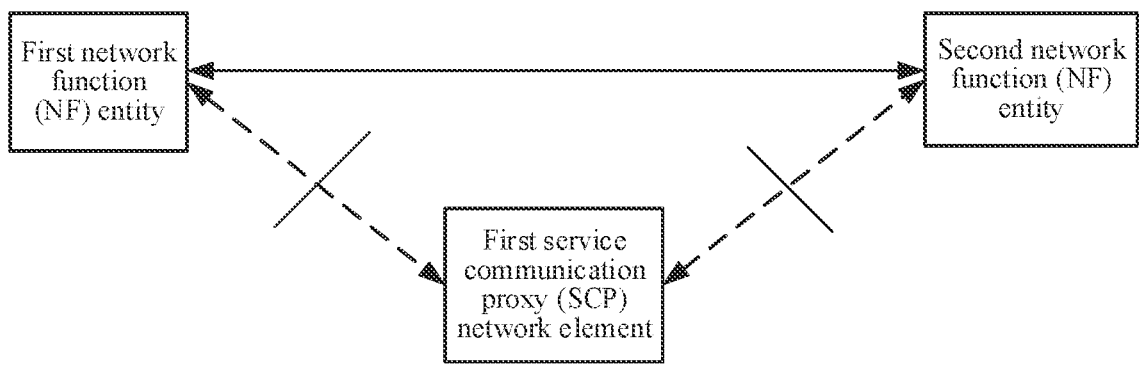
FIG. 3 is a schematic diagram of another network architecture of a communication system according to an embodiment of this application.

In some implementations, based on the communication system shown in FIG. 1, in another embodiment of the communication system provided in the embodiments of this application, as shown in FIG. 3, which is a schematic diagram of another network architecture of a communication system according to an embodiment of this application, after the first SCP network element fails, the communication system may not check, by using a control function entity, whether another valid SCP network element exists. Instead, the first NF entity directly communicates with the second NF entity.

Figure 4:
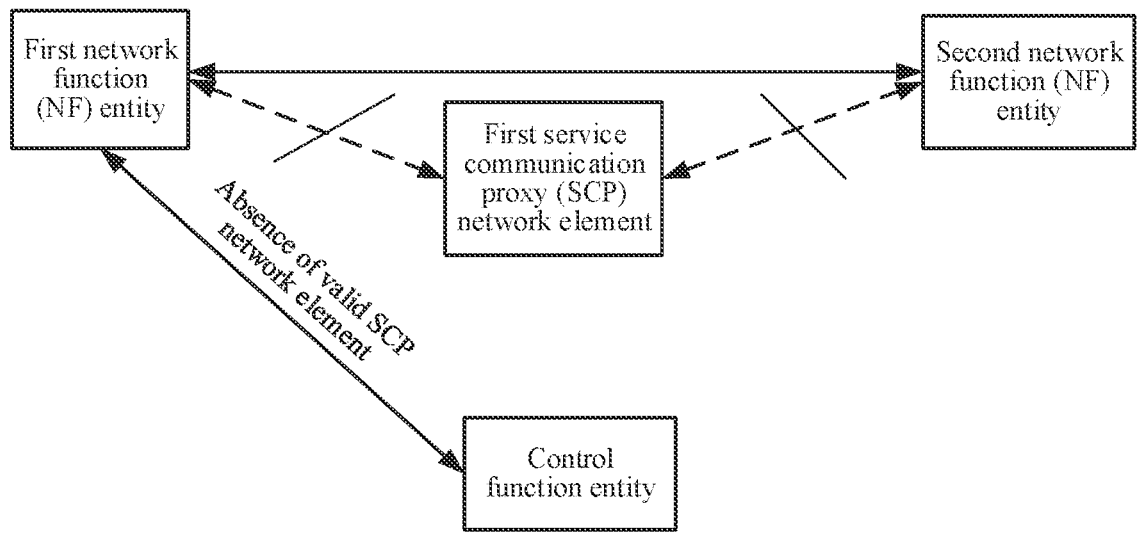
FIG. 4 is a schematic diagram of another network architecture of a communication system according to an embodiment of this application.

In some implementations, in another embodiment of the communication system provided by the embodiments of this application, as shown in FIG. 4, which is a schematic diagram of another network architecture of a communication system according to an embodiment of this application, after the first SCP network element fails, if the communication system does not find a valid SCP network element by using a control function entity for the first NF entity, the first NF entity may directly communicate with the second NF entity.

In the foregoing implementations, after the first SCP network element fails, either searching for another valid SCP network element again to further establish indirect communication between the first NF entity and the second NF entity by using the valid second SCP network element or establishing, by the first NF entity, direct communication with the second NF entity can ensure that the first NF entity and the second NF entity can continue business communication when the SCP network element used for communication between the first NF entity and the second NF entity fails, thereby ensuring the business continuity and the reliability and availability of a system.

Based on the foregoing described network architectures of the communication system, an embodiment of a communication method in the embodiments of this application is described below with reference to FIG. 5.

Figure 5:
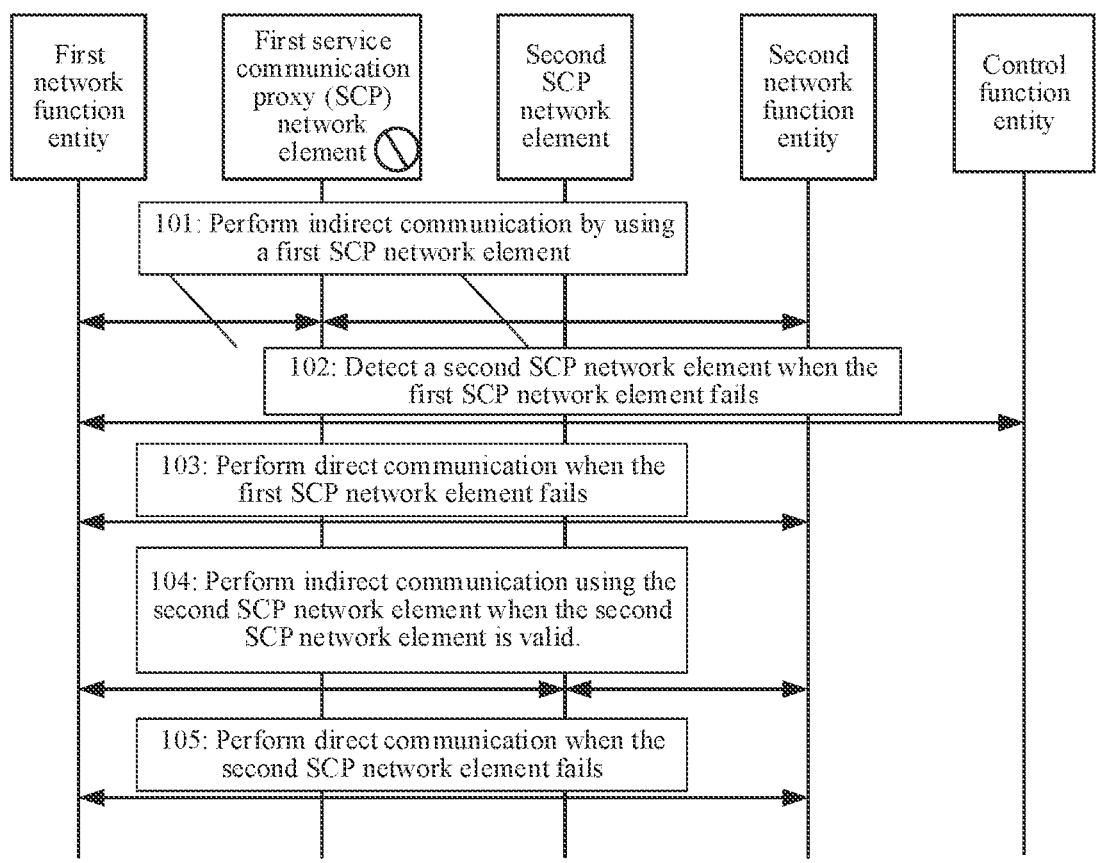
FIG. 5 is a schematic diagram of an embodiment of a communication method according to an embodiment of this application.

As shown in FIG. 5, an embodiment of the communication method provided by the embodiments of this application may include the following steps:

101: A first NF entity indirectly communicates with a second NF entity by using a first SCP network element. In some embodiments, the first NF entity is a first electronic device or an entity (e.g., a component) that is included in the first electronic device. In some embodiments, the second NF entity is a second electronic device or an entity (e.g., a component) that is included in the second electronic device.

102: In accordance with a determination by the first NF entity that the first SCP network element fails, the first NF entity detects a second. SCP network element.

A manner in which the first NF entity determines that the first SCP network element fails may be that when the first NF entity cannot receive a response from the first SCP network element all the time while requesting the first SCP network element to select a second NF entity for the first NF entity, it can be determined that the first SCP network element fails.

A process of detecting the second SCP network element by the first NF entity may include two processes, namely, finding and selection.

The finding process may be that the first NF entity finds the second SCP network element by using a control function entity, for example, the control function entity feeds back a list of information about valid SCP network elements including second SCP network elements to the first NF entity.

The selection process may be that the first NF entity selects the second SCP network element from the list of information about valid SCP network elements fed back by the control function entity.

103: The first NF entity returns to directly communicating with the second NF entity.

Step 102 and step 103 are performed alternatively. If step 102 is performed, step 103 is not performed; if step 103 is performed, step 102 is not performed. That is, when the first SCP network element fails, the first NF entity may detect another SCP network element (for example, the second SCP network element) to ensure that the first NF entity can continue business communication with the second NF entity. Alternatively, the first NF entity may return to directly communicating with the second NF entity (e.g., bypassing the first SCP network element, or without using a SCP network element, etc) to ensure that the first NF entity can continue business communication with the second NF entity. If the first NF entity detects another SCP network element to ensure that the first NF entity can continue business communication with the second NF entity, because the detected another SCP network element may be valid or may fail, different communication manners may be determined depending on whether the second SCP network element is valid. Therefore, whether the second SCP network element is valid needs to be determined. A determining manner is the same as the foregoing manner of determining whether the first SCP network element is valid. Details are not described herein again.

104: t In accordance with a determination by the first NF entity that the second SCP network element is valid, the first NF entity switches from the first SCP network element to the second SCP network element and indirectly communicates with the second NF entity by using the second SCP network element.

105: In accordance with a determination by the first NF entity that the second SCP network element fails, the first NF entity returns to directly communicating with the second NF entity (e.g., by bypassing the first SCP network element, the second SCP network element, any SCP network element, etc.) when. In the embodiments of this application, when the SCP network element used by the first NF entity for communication with the second NF entity fails, another available SCP network element may be switched to or the first NF entity may return to directly communicating with the second NF entity. In this way, it can be ensured that the first NF entity can continue business communication with the second NF entity, thereby ensuring the business continuity and the reliability and availability of a system.

In some implementations, the first SCP network element may not be the first SCP network element selected by the first NF entity for use, and may be switched to from another SCP network element. Therefore, before step 101, the first NF entity may select a third SCP network element. In accordance with a determination by the first NF entity that the third SCP network element fails to select the second NF entity for the first NF entity, the first NF entity selects the first SCP network element to establish a communication connection between the first NF entity and the second NF entity.

For example, in some implementations, when requesting the third SCP network element to select the second NF entity for the first NF entity, if the first NF entity cannot receive a response from the third SCP network element, it can be determined that the third SCP network element fails in selecting the second NF entity. In this case, the first NF entity may select the first SCP network element from valid SCP network elements and select the second NF entity for the first NF entity by using the first SCP network element.

There may be various implementations of detecting the second SCP network element by the first NF entity in step 102. In some implementations, the first NF entity selects N valid SCP network elements from configured M valid SCP network elements as the second SCP network elements, M being an integer greater than 0, and N being an integer greater than 0 and less than or equal to M.

In this case, the detection is implemented through statical configuration, A plurality of valid SCP network elements are configured for the first NF entity during initial configuration. After one SCP network element fails, a second SCP network element may be selected from the remaining valid SCP network elements. In this scenario, the M valid SCP network elements may be understood as the remaining valid SCP network elements.

In some implementations, the first NF entity transmits a first query request to the control function entity. After receiving the first query request, the control function entity may transmit a first query response to the first NF entity according to the first query request. Because the first query response includes information about the M valid SCP network elements, after receiving the first query response, the first NF entity may select the N valid SCP network elements from the M valid SCP network elements as the second SCP network elements, M is an integer greater than 0, and N is an integer greater than 0 and less than or equal to M.

In some implementations, the first NF entity transmits a second query request to the control function entity. After receiving the second query request, the control function entity may transmit a second query response to the first NF entity according to the second query request. When the second query response indicates absence of a valid SCP network element, it indicates that the second SCP network element fails.

In this embodiment, functions of the first query request and the second query request are the same, both for querying the control function entity for whether a valid second SCP network element exists.

Figure 6:
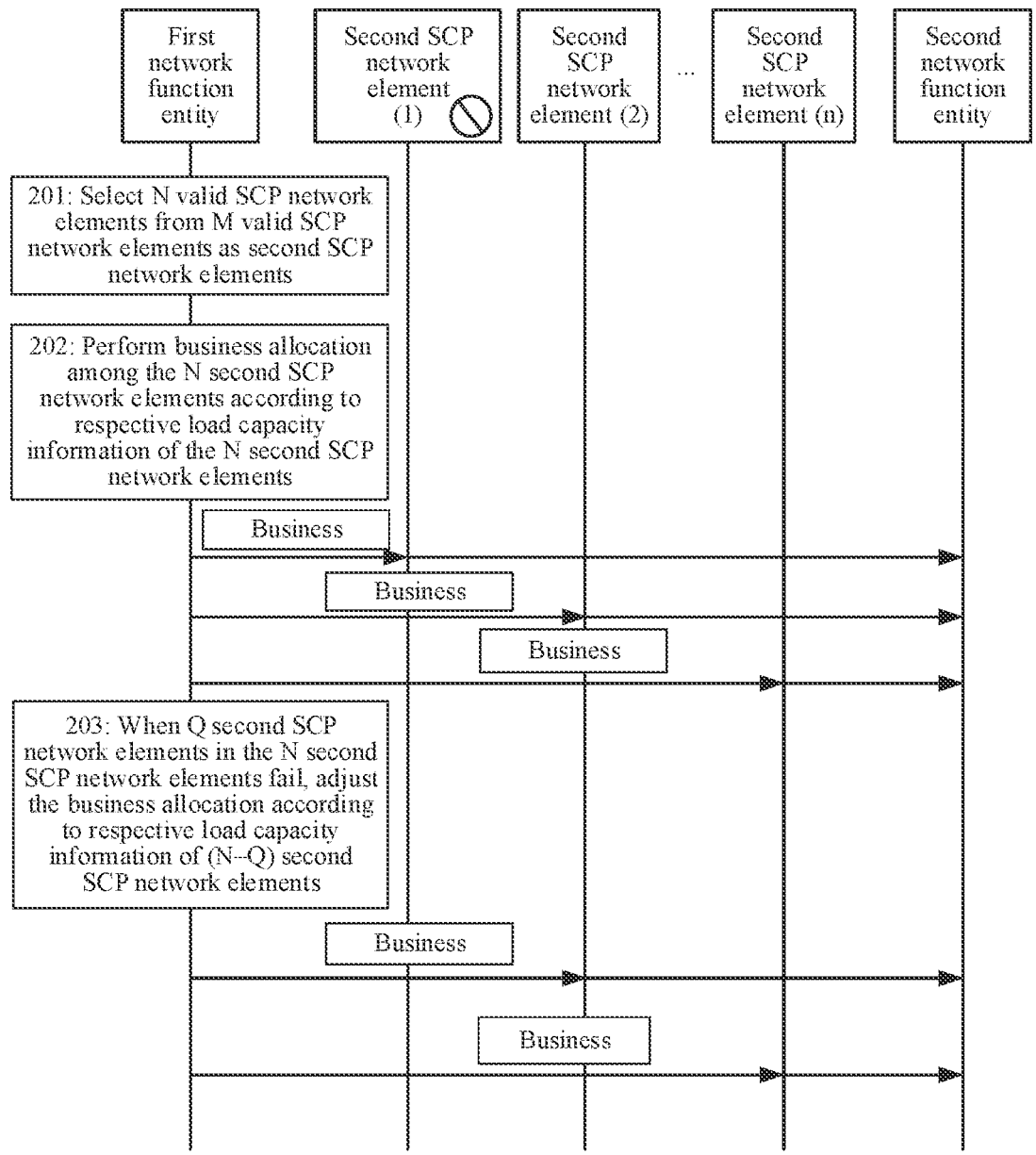
FIG. 6 is a schematic diagram of another embodiment of a communication method according to an embodiment of this application.

When the first NF entity detects M valid SCP network elements, referring to FIG. 6, another embodiment of the communication method provided in the embodiments of this application may include the following steps:

201: The first NF entity selects N valid SCP network elements from the M valid SCP network elements as the second SCP network elements, N being an integer greater than 0 and less than or equal to M.

The first NF entity may select one second SCP network element, or may select two or more second SCP network elements. If two or more second SCP network elements are selected, business allocation may be performed according to step 202 due to different business capabilities of the second SCP network elements.

202: The first NF entity performs business allocation among the N second SCP network elements according to respective load capacity information of the N second SCP network elements.

If the first NF entity determines that there are a plurality of available second SCP network elements, business may be allocated according to respective load capacity information of the second SCP network elements in a load balancing manner. The load capacity information may be represented by a weight factor. That is, business may be allocated according to weight factors of the second SCP network elements.

In some implementations, business may be allocated according to proportions of the weight factors of the second SCP network elements in a sum of the weight factors of all the second SCP network elements.

For example, if the second SCP network elements include SCP-1, SCP-2, and SCP-3, a weight factor corresponding to the SCP-1 is 1.0, a weight factor corresponding to the SCP-2 is 0.5, and a weight factor corresponding to the SCP-3 is 0.6, the first NF entity may transmit 1.0/(1.0+0.5+0.6)=47.6% of business requests to the SCP-1, transmit 0.54/(1.0+0.5+0.6) =23.8% of business requests to the SCP-2, and transmit 0.6/(1.0+0.5+0.6)=28.6% of business requests to the SCP-3.

In some embodiments, to ensure load balance, business allocation may alternatively be performed according to the following:

1. The first NF entity may use different SCP network elements fir different messages of user equipment (UE), for example, use the SCP-1 for a message A of the UE and use the SCP-2 for a message B of the UE.

2. The UE may establish different packet data unit (PDU) sessions, and different SCP network elements may be used for different PDU sessions. For example, the SCP-1 is used for a PDU session 1, and the SCP-2 is used for a PDU session 2.

3. Different SCP network elements may be used for different types of Internet Protocol (IP) addresses used by the UE. The SCP-1 is used when a type of an IP address used by the UE is IPv4, and the SCP-2 is used when a type of an IP address used by the UE is IPv6.

4. Different SCP network elements are used based on different UE business types. For example, the SCP-1 is used for short messages, the SCP-2 is used for security authentication, and the SCP-3 is used for mobility management.

5. Different SCP network elements are used for different data network names (DNNs) or different single network slice selection assistance information (S-NSSAI).

Certainly, the foregoing cases are merely examples for description. Actually, this embodiment of this application is not limited to the listed examples. It is to be expressed that, when there are a plurality of available SCP network elements, the plurality of SCP network elements may be used in multiple dimensions according to actual situations, to achieve relative load balance.

The foregoing manners are merely described for performing load balancing for business requests from one UE. Actually, the load balancing may be alternatively performed in another dimension. In this example, the first NF entity selects a second SCP network element from the N second SCP network elements to provide a business service for a connected terminal. For example, all business requests for UE1 are allocated to the SCP-1, all business requests for UE2 are allocated to the SCP-2, and all business requests for UE3 are allocated to the SCP-3.

In another scenario, the UE may be referred to as a terminal (e.g., an apparatus, an electronic device, etc.) and is a device with a wireless transceiver function. The device may be deployed on the land, including an indoor or outdoor device, a handheld device, or an in-vehicle device; or may be deployed on the water (for example, on a steamship); or may be deployed in the air (for example, on an airplane, a balloon, or a satellite). The terminal may be a mobile phone, a tablet computer (Pad), a computer with a wireless transceiver function, a virtual reality (VR) terminal, an augmented reality (AR) terminal, a wireless terminal in industrial control, a wireless terminal in remote medical, a wireless terminal in a smart grid, a wireless terminal in transportation safety, a wireless terminal in a smart city, a wireless terminal in a smart home, or the like.

203. When (e.g., in accordance with a determination that) Q second SCP network elements in the N second SCP network elements fail, the first NF entity adjusts the business allocation according to respective load capacity information of (N-Q) second SCP network elements, Q and N are integers, and Q is greater than 0 and less than N.

For example, if the SCP-1 fails, the first NF entity adjusts the business allocation between the SCP-2 and SCP-n. The SCP-1 may be a second SCP network element (1) in FIG. 6, the SCP-2 may be a second SCP network element (2) in FIG. 6, . . . , and the SCP-n may be a second SCP network element (n) in FIG. 6.

In the solution provided in this embodiment of this application, when there are a plurality of available second SCP network elements, load balancing may be performed according to load capacities of the second SCP network elements, thereby improving business processing capabilities.

In the communication method provided in the embodiments of this application, the first NF entity may further notify the control function entity or the third NF entity of which SCP network elements fail. For example, the first NF entity transmits, to the control function entity or the third NF entity, a first notification message indicating that the first SCP network element or the second SCP network element fails, so that the control function entity timely updates, according to the first notification message, information about whether recorded SCP network elements fail, to provide an accurate list of valid SCP network elements. In addition, a scenario that the third NF entity selects an invalid SCP network element is avoided.

The third NF entity may be an NF entity other than the first NF entity and the second NF entity.

Figure 7:
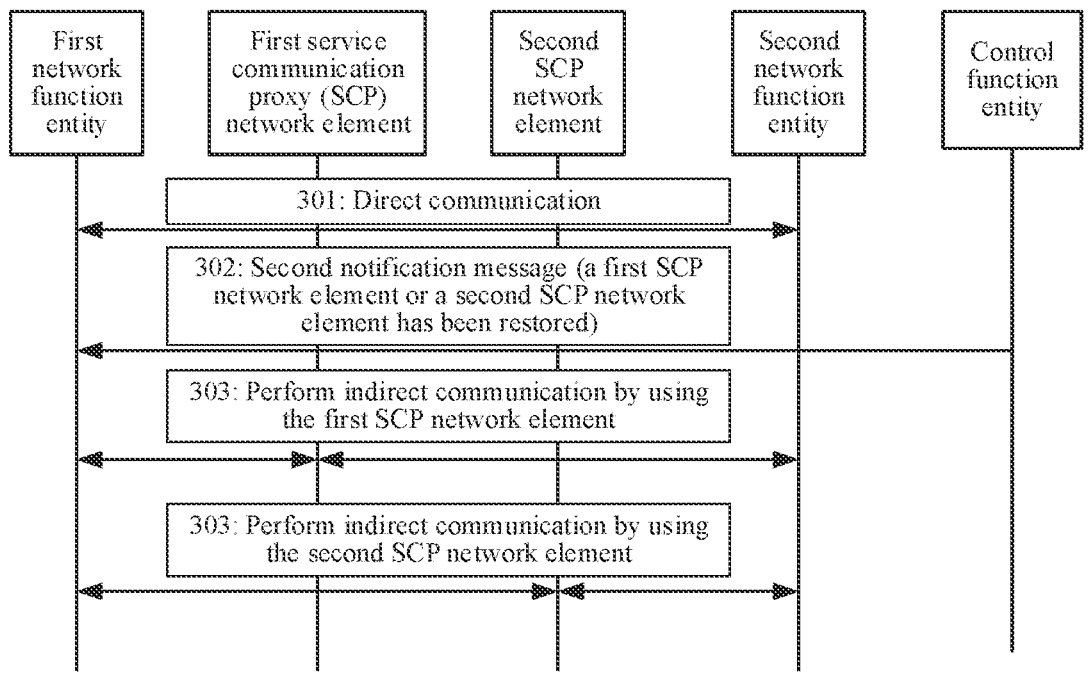
FIG. 7 is a schematic diagram of another embodiment of a communication method according to an embodiment of this application.

An invalid SCP network element may be further restored to a valid state again. For the SCP network element restored to a valid state, as shown in FIG. 7, the communication method provided in the embodiments of this application may further include:

301: The first NF entity returns to directly communicating with the second NF entity.

302: The first NF entity receives a second notification message indicating that the first SCP network element is restored to a valid state or the second SCP network element is restored to a valid state.

303: The first NF entity switches, according to the second notification message, to indirectly communicating with the second NF entity by using the first SCP network element or the second SCP network element.

When the second notification message indicates that the first SCP network element is restored to a valid state, the first NF entity switches to indirectly communicating with the second NF entity by using the first SCP network element. When the second notification message indicates that the second SCP network element is restored to a valid state, the first NF entity switches to indirectly communicating with the second NF entity by using the second SCP network element.

In this embodiment of this application, if the SCP network element is restored, the first NF entity may switch from direct communication to indirect communication, thereby further ensuring the reliability of a system while ensuring the service continuity.

Figure 8:
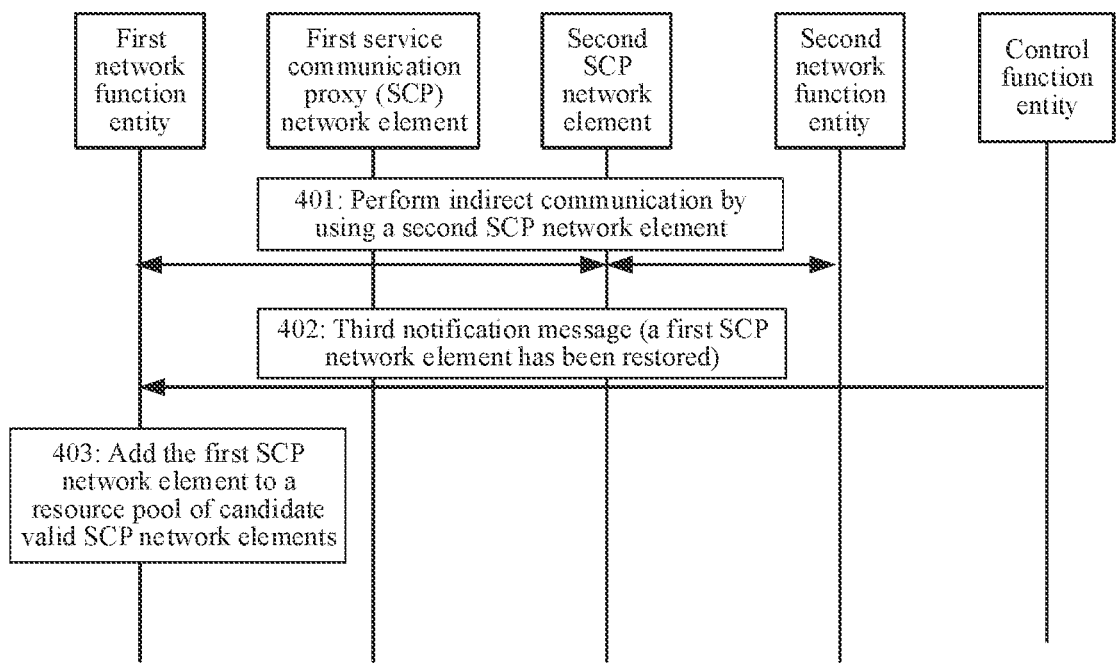
FIG. 8 is a schematic diagram of another embodiment of a communication method according to an embodiment of this application.

An invalid first SCP network element may be further restored to a valid state again. For the first SCP network element restored to a valid state, as shown in FIG. 8, the communication method provided in the embodiments of this application may further include:

401: The first NF entity performs the indirect communication with the second NF entity by using the second SCP network element.

402: The first NF entity receives a third notification message indicating that the first SCP network element is restored to a valid state.

403: The first NF entity adds the first SCP network element to a resource pool of candidate valid SCP network elements according to the third notification message.

Regarding when the first SCP network element will be selected as a proxy between the first NF entity and the second NF entity again, reference may be made to the foregoing described solution. For example, when the first SCP network element and the second SCP network element perform load balancing for business requests or when the second SCP network element fails, and an SCP network element is further selected from the resource pool of the valid SCP network elements, the first SCP network element may be selected again to provide an indirect communication service for the first NF entity and the second NF entity.

The network architectures and the communication method involved in the embodiments of this application are described above. A communication apparatus provided by the embodiments of this application is described below with reference to accompanying drawings.

Figure 9:
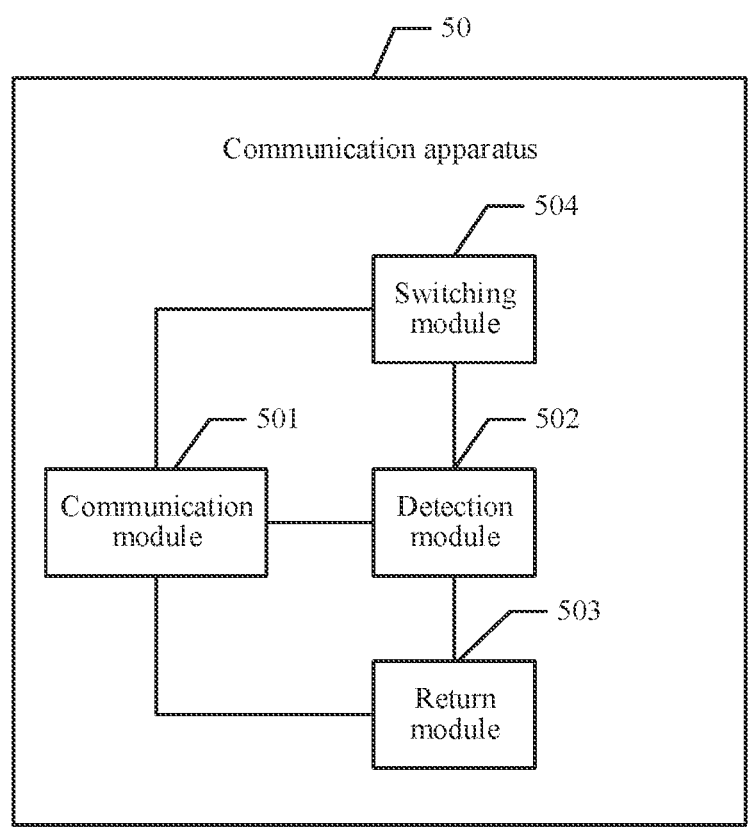
FIG. 9 is a schematic diagram of an embodiment of a communication apparatus according to an embodiment of this application.

As shown in FIG. 9, an embodiment of a communication apparatus 50 provided in the embodiments of this application may include:

a communication module 501, configured to indirectly communicate with a second NF entity by using a first SCP network element;

a detection module 502, configured to detect a second SCP network element when it is determined that the first SCP network element fails;

a return module 503, configured to return to directly communicating with the second NF entity when it is determined that the first SCP network element fails; and a switching module 504, configured to switch from the first SCP network element to the second SCP network element when the detection module detects that the second SCP network element is valid, the communication module 501 being further configured to indirectly communicate with the second NF entity by using the second SCP network element that is switched to by the switching module; and the return module 503 being further configured to return to directly communicating with the second. NF entity when the detection module detects that the second SCP network element fails.

In the embodiments of this application, when the SCP network element used by the first NF entity for communication with the second NF entity fails, another available SCP network element may be switched to or the first NF entity may return to directly communicating with the second NF entity. In this way, it can be ensured that the first NF entity can continue business communication with the second NF entity, thereby ensuring the business continuity and the reliability and availability of a system.

Figure 10:
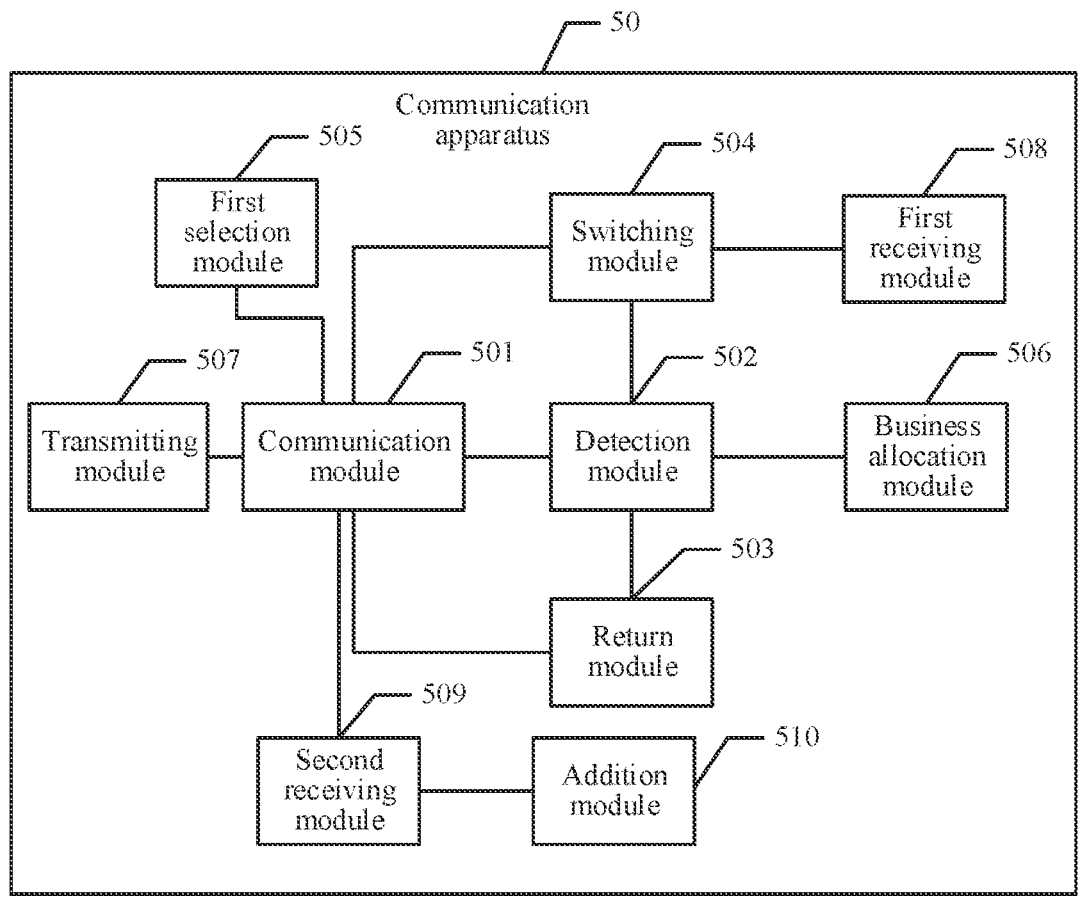
FIG. 10 is a schematic diagram of another embodiment of a communication apparatus according to an embodiment of this application.

In some implementations, as shown in FIG. 10, the communication apparatus 50 may further include a first selection module 505.

The first selection module 505 is configured to select a third SCP network element, and select, when the third SCP network element fails in selecting the second NF entity for the first NF entity, the first SCP network element to establish a communication connection between the first NF entity and the second NF entity.

In some implementations, the detection module 502 is configured to select N valid SCP network elements from configured M valid SCP network elements as the second SCP network elements, M being an integer greater than 0, and N being an integer greater than 0 and less than or equal to M.

In some implementations, the detection module 502 may include:
  a first transmitting unit, configured to transmit a first query request to a control function entity; and
  a first receiving unit, configured to receive a first query response transmitted by the control function entity, the first query response including information about M valid SCP network elements, M being an integer greater than 0.

The first selection module is further configured to select N valid SCP network elements from the M valid SCP network elements as the second SCP network elements, N being an integer greater than 0 and less than or equal to M.

In some implementations, the detection module 502 may include:
  a second transmitting unit, configured to transmit a second query request to a control function entity; and
  a second receiving unit, configured to receive a second query response transmitted by the control function entity, the second query response being used for indicating absence of a valid SCP network element, the absence of a valid SCP network element representing that the second SCP network element fails.

Actually, the first transmitting unit, the second transmitting unit, the first receiving unit, and the second receiving unit are substantially the same, and each are a transmitting unit or a receiving unit.

In some implementations, the communication apparatus 50 further includes:
  a business allocation module 506, configured to perform business allocation among the N second SCP network elements according to respective load capacity information of the N second SCP network elements.

In some implementations, the business allocation module 506 is further configured to adjust, when Q second SCP network elements in the N second SCP network elements fail, the business allocation according to respective load capacity information of (N-Q) second SCP network elements, Q and N are integers, and Q is greater than 0 and less than N.

In some implementations, the communication apparatus 50 further includes:
  a transmitting module 507, configured to transmit, to the control function entity or a third NF entity, a first notification message indicating that the first SCP network element or the second SCP network element fails.

In some implementations, the communication apparatus 50 further includes:
  a first receiving module 508, configured to receive, when the first NF entity returns to directly communicating with the second network entity, a second notification message indicating that the first SCP network element is restored to a valid state or the second SCP network element is restored to a valid state.

The switching module 504 is further configured to switch, according to the second notification message, to indirectly communicating with the second NF entity by using the first SCP network element or the second SCP network element.

In some implementations, the communication apparatus 50 further includes:
  a second receiving module 509, configured to receive, when the first NF entity communicates with the second NF entity by using the second SCP network element, a third notification message indicating that the first SCP network element is restored to a valid state; and
  an addition module 510, configured to add the first SCP network element to a resource pool of candidate valid SCP network elements according to the third notification message.

The foregoing describes the solutions provided in the embodiments of this application mainly from the perspective of interaction between entities. It may be understood that, to implement the foregoing functions, the foregoing first NF entity includes a corresponding hardware structure and/or software modules for performing the functions. A person skilled in the art is to be easily aware that, in combination with the functions described in the embodiments disclosed in this specification, this application can be implemented by hardware or a combination of hardware and computer software. Whether a function is performed by hardware or computer software driving hardware depends on particular applications and design constraints of the technical solutions. Those skilled in the art may use different methods to implement the described functions for each particular application, but such implementation is not to be considered beyond the scope of this application.

In terms of a physical apparatus, the first NF entity may be implemented by using one physical apparatus, or may be jointly implemented by using a plurality of physical apparatuses, or may be a logical function unit in a physical apparatus. This is not specifically limited in this embodiment of this application.

Figure 11:
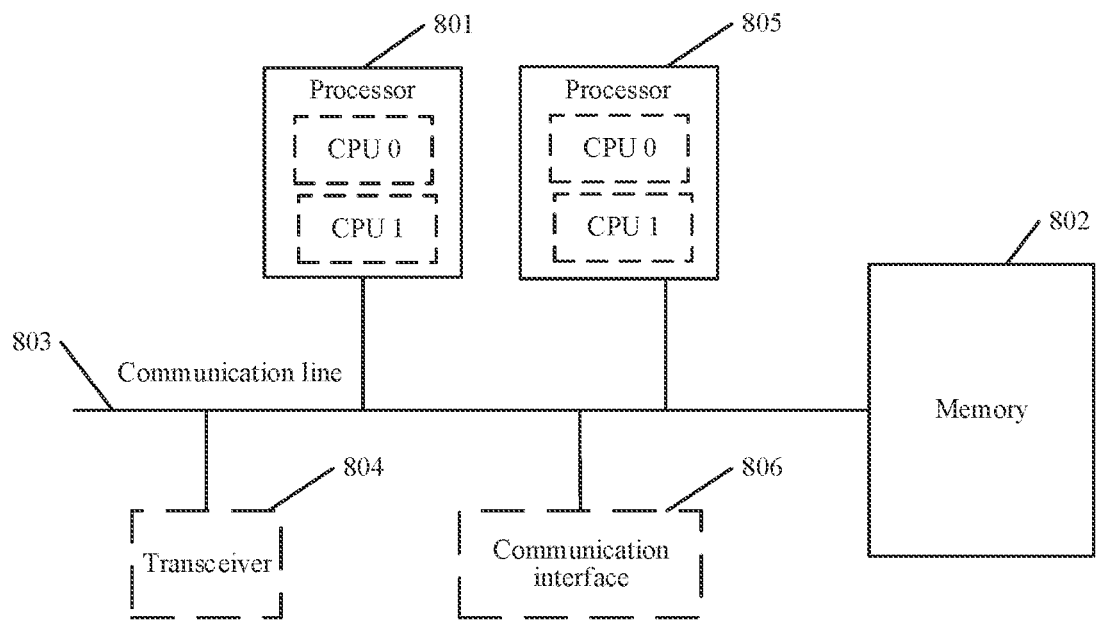
FIG. 11 is a schematic diagram of an embodiment of a communication device according to an embodiment of this application.

For example, the first NF entity may be implemented by using the communication device in FIG. 11. FIG. 11 is a schematic structural diagram of hardware of a communication device according to an embodiment of this application. The communication device includes at least one processor 801, a memory 802, and a communication line 803. The communication device may further include at least one of a transceiver 804 and a communication interface 806.

The processor 801 may be a general-purpose central processing unit (CPU), a microprocessor, an application-specific integrated circuit (ASIC), or one or more integrated circuits configured to control execution of a program in the solutions of this application.

The communication line 803 may include a channel, to transmit information between the foregoing components.

The transceiver 804 is an apparatus using any transceiver-type apparatus, and is configured to communicate with another device or a communication network such as the Ethernet, a radio access network (RAN), or a wireless local area network (WLAN). The transceiver 804 may alternatively be a transceiver circuit or a transceiver machine. When the communication device is the first NF entity, the communication device may include the transceiver.

The communication device may further include the communication interface 806.

The memory 802 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and connect to the processor 801 by using the communication line 803. The memory 802 may alternatively be integrated with the processor 801.

The memory 802 is configured to store computer executable instructions for executing the solutions of this application, and the processor 801 controls the execution. The processor 801 is configured to execute the computer executable instructions stored in the memory 802, to implement the communication method provided by the method embodiments of this application.

In some implementations, the computer executable instructions in this embodiment of this application may also be referred to as application code. This is not specifically limited in this embodiment of this application.

During specific implementation, in an embodiment, the processor 801 may include one or more CPUs, for example, a CPU 0 and a CPU 1 in FIG. 11.

During specific implementation, in an embodiment, the communication device may include a plurality of processors, for example, a processor 801 and a processor 805 in FIG. 11. Each of these processors may be a single-core (single-CPU) processor, or may be a multi-core (multi-CPU) processor. The processor herein may be one or more devices or circuits, and/or a processing core configured to process data (for example, computer executable instructions).

In terms of the function unit, this application may perform function unit division for the control function entity and the first NF entity according to the foregoing method embodiments. For example, various function units may be obtained through division according to the corresponding functions, or two or more functions may be integrated into one function unit. The integrated function unit may be implemented in the form of hardware, or may be implemented in the form of a software function unit.

The first receiving module 509, the second receiving module 510, the transmitting module 508, and the communication module 501 all may be implemented by using the transceiver 804. Certainly, the communication module 501 may be further implemented by using the communication interface 806. The detection module 502 may also be implemented by using the transceiver 804.

The switching module 504, the return module 503, the addition module 511, the first selection module 505, and the business allocation module 506 may be all implemented by using the processor 801 or the processor 805.

All or some of the foregoing embodiments may be implemented by using software, hardware, firmware, or any combination thereof. When software is used for implementation, implementation may be entirely or partially performed in the form of a computer program product.

The computer program product includes one or more computer instructions. When the computer program instructions are loaded and executed on a computer, all or some of the processes or functions according to the embodiments of this application are produced. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by the computer, or a data storage device, such as a server or a data center in which one or more usable mediums are integrated. The usable medium may be a magnetic medium (for example, a soft disk, a hard disk, or a magnetic tape), an optical medium (for example, a DVD), a semiconductor medium (for example, a solid state disk (SSD)), or the like. A person of ordinary skill in the art may understand that all or some of the steps of the methods in the embodiments may be implemented by a program instructing relevant hardware. The program may be stored in a computer-readable storage medium. The storage medium may include: a ROM, a RAM, a magnetic disk, or an optical disc.

The communication method, the communication apparatus, and the NF entities provided in the embodiments of this application are described above in detail. Although the principles and implementations of this application are described by using specific examples in this specification, the descriptions of the foregoing embodiments are merely intended to help understand the method and the core idea of this application. Meanwhile, a person skilled in the art may make modifications to the specific implementations and application range according to the idea of this application. Based on the above, the content of this specification shall not be construed as a limitation to this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs detection and/or communication. In practical application, the foregoing functions may be allocated to and completed by different functional modules according to requirements, that is, an inner structure of a device is divided into different functional modules to implement all or a part of the functions described above.

What is claimed is:

1. A communication method performed at a first electronic device that includes a first network function (NF) entity, comprising:
    communicating indirectly with a second electronic device that includes a second NF entity using a first service communication proxy (SCP) network element;
    in accordance with a determination that the first SCP network element fails:
        detecting a second SCP network element; and
        determining whether the second SCP network element is valid;
    in accordance with a determination that the second SCP network element is valid:
        switching from the first SCP network element to the second SCP network element; and
        communicating indirectly with the second NF entity using the second SCP network element; and
    in accordance with a determination that the second SCP network element fails:
        communicating directly with the second NF entity by bypassing the first SCP network element and the second SCP network element.

2. The communication method according to claim 1, further comprising:
    prior to the communicating indirectly with the second NF entity using the first SCP network element:
        selecting, by the first NF entity, a third SCP network element;
        sending, by the first NF entity, a request to the third SCP network element to select the second NF entity; and
        in accordance with a determination that the third SCP network element fails to select the second NF entity for the first NF entity:
            selecting, by the first NF entity, the first SCP network element to establish a communication connection between the first NF entity and the second NF entity.

3. The communication method according to claim 1, wherein detecting the second SCP network element further comprises:
    selecting, by the first NF entity, N valid SCP network elements from configured M valid SCP network elements as the second SCP network element, wherein M is an integer greater than 0 and N is an integer greater than 0 and less than or equal to M.

4. The communication method according to claim 3, wherein N is greater than 1, the method further comprising:
    performing, by the first NF entity, business allocation among the N second SCP network elements according to respective load capacity information of the N second SCP network elements.

5. The communication method according to claim 4, further comprising:
    in accordance with a determination by the first NF entity that Q second SCP network elements in the N second SCP network elements fail, wherein Q is an integer greater than 0 and less than N:
        adjusting, by the first NF entity, the business allocation according to respective load capacity information of (N-Q) second SCP network elements.

6. The communication method according to claim 3, wherein N is greater than 1, the method further comprising:
    selecting, by the first NF entity, a second SCP network element from the N second SCP network elements to provide a business service for a connected terminal.

7. The communication method according to claim 1, wherein detecting the second SCP network element further comprises:
    transmitting, by the first NF entity, a first query request to a control function entity;
    receiving, by the first NF entity, a first query response transmitted by the control function entity, the first query response comprising information about M valid SCP network elements, wherein M is an integer greater than 0; and
    selecting, by the first NF entity, N valid SCP network elements from the M valid SCP network elements as the second SCP network elements, wherein N is an integer greater than 0 and less than or equal to M.

8. The communication method according to claim 1, wherein detecting the second SCP network element further comprises:
    transmitting, by the first NF entity, a second query request to a control function entity; and
    receiving, by the first NF entity, a second query response transmitted by the control function entity, the second query response being used for indicating absence of a valid SCP network element, the absence of a valid SCP network element representing that the second SCP network element fails.

9. The communication method according to claim 1, further comprising:
    transmitting, by the first NF entity to a control function entity or a third NF entity, a first notification message indicating that the first SCP network element or the second SCP network element fails.

10. The communication method according to claim 1, further comprising:
    while communicating indirectly with the second NF entity:
        receiving, by the first NF entity, a second notification message indicating that the first SCP network element or the second SCP network element is restored to a valid state; and
        in accordance with the second notification message, switching, by the first NF entity, to indirectly communicating with the second NF entity by using the first SCP network element or the second SCP network element.

11. The communication method according to claim 1, further comprising:
    while communicating indirectly with the second NF entity using the second SCP network element:
        receiving, by the first NF entity, a third notification message indicating that the first SCP network element is restored to a valid state; and
        adding, by the first NF entity, the first SCP network element to a resource pool of candidate valid SCP network elements according to the third notification message.

12. The communication method according to claim 1, wherein:
    the first NF entity is an NF network element or an NF service module; and the second NF entity is an NF network element or an NF service module.

13. An electronic device, comprising:
a first network function (NF) entity;
one or more processors; and
memory storing one or more programs, that, when executed by the one or more processors, cause the one or more processors to perform operations comprising:
communicating indirectly with a second electronic device that includes a second NF entity using a first service communication proxy (SCP) network element;
in accordance with a determination that the first SCP network element fails:
detecting a second SCP network element; and
determining whether the second SCP network element is valid;
in accordance with a determination that the second SCP network element is valid:
switching from the first SCP network element to the second SCP network element; and
communicating indirectly with the second NF entity using the second SCP network element; and
in accordance with a determination that the second SCP network element fails:
communicating directly with the second NF entity by bypassing the first SCP network element and the second SCP network element.

14. The electronic device according to claim 13, the operations further comprising:
prior to the communicating indirectly with the second NF entity using the first SCP network element:
selecting, by the first NF entity, a third SCP network element;
sending, by the first NF entity, a request to the third SCP network element to select the second NF entity; and
in accordance with a determination that the third SCP network element fails to select the second NF entity for the first NF entity:
selecting, by the first NF entity, the first SCP network element to establish a communication connection between the first NF entity and the second NF entity.

15. The electronic device according to claim 13, wherein detecting the second SCP network element further comprises:
selecting, by the first NF entity, N valid SCP network elements from configured M valid SCP network elements as the second SCP network element, wherein M is an integer greater than 0 and N is an integer greater than 0 and less than or equal to M.

16. The electronic device according to claim 15, wherein N is greater than one, the operations further comprising:
performing, by the first NF entity, business allocation among the N second SCP network elements according to respective load capacity information of the N second SCP network elements.

17. The electronic device according to claim 16, the operations further comprising:
in accordance with a determination by the first NF entity that Q second SCP network elements in the N second SCP network elements fail, wherein Q is an integer greater than 0 and less than N:
adjusting, by the first NF entity, the business allocation according to respective load capacity information of (N-Q) second SCP network elements.

18. A non-transitory computer-readable storage medium storing instructions that, when executed by one or more processors of an electronic device, cause the one or more processors to perform operations comprising:
communicating indirectly with a second electronic device that includes a second NF entity using a first service communication proxy (SCP) network element;
in accordance with a determination that the first SCP network element fails:
detecting a second SCP network element; and
determining whether the second SCP network element is valid;
in accordance with a determination that the second SCP network element is valid:
switching from the first SCP network element to the second SCP network element; and
communicating indirectly with the second NF entity using the second SCP network element; and
in accordance with a determination that the second SCP network element fails:
communicating directly with the second NF entity by bypassing the first SCP network element and the second SCP network element.

19. The non-transitory computer-readable storage medium according to claim 18, the operations further comprising:
transmitting, by the first NF entity to a control function entity or a third NF entity, a first notification message indicating that the first SCP network element or the second SCP network element fails.

20. The non-transitory computer-readable storage medium according to claim 18, the operations further comprising:
while communicating indirectly with the second NF entity:
receiving, by the first NF entity, a second notification message indicating that the first SCP network element or the second SCP network element is restored to a valid state; and
in accordance with the second notification message, switching, by the first NF entity, to indirectly communicating with the second NF entity by using the first SCP network element or the second SCP network element.

* * * * *